United States Patent [19]

Tsubaki

[11] Patent Number: 4,890,193
[45] Date of Patent: Dec. 26, 1989

[54] GAS-INSULATED SWITCHGEAR EQUIPMENT

[75] Inventor: Tohru Tsubaki, Hitachi, Japan

[73] Assignee: Hitachi, Ltd., Tokyo, Japan

[21] Appl. No.: 203,764

[22] Filed: Jun. 8, 1988

[30] Foreign Application Priority Data

Jun. 11, 1987 [JP] Japan .................. 62-144021

[51] Int. Cl.$^4$ .................................. H02B 1/20
[52] U.S. Cl. .................. 361/341; 361/335; 361/355; 361/361
[58] Field of Search .................. 200/50 AA; 361/332–335, 341, 355, 361

[56] References Cited

U.S. PATENT DOCUMENTS

| | | | |
|---|---|---|---|
| 4,005,345 | 1/1977 | Kane et al. | 317/103 |
| 4,209,821 | 6/1980 | Kobayoshi et al. | 361/341 |
| 4,237,520 | 12/1980 | Oishi et al. | 361/335 |
| 4,262,323 | 4/1981 | Yoshida | 361/333 |
| 4,503,481 | 3/1985 | Fujiya et al. | 361/341 |
| 4,752,860 | 6/1988 | Romanet et al. | 361/335 |

FOREIGN PATENT DOCUMENTS 57-193911 11/1982 Japan .
57-211915 12/1982 Japan .
59-006706 1/1984 Japan .

OTHER PUBLICATIONS

The article by Brown Boveri Rev., FIGS. 9–10 of a switchgear unit, vol. 4, No. 73, p. 147 (no date was given).

Primary Examiner—Gregory N. Thompson
Attorney, Agent, or Firm—Antonelli, Terry & Wands

[57] ABSTRACT

Gas-insulated switchgear equipment includes a plurality of vertical-type circuit breakers electrically connected in series, and outside led-out devices connected to connected portions of a series connection of the circuit breakers and at least one main bus bar connected to two of the plurality of circuit breakers located at both ends of the series connection. In the equipment, the circuit breakers are a vertical type circuit breaker and are arranged on a substantial straight line and led-out portions for leading out terminals formed in the circuit breakers in a direction perpendicular to a direction of the arrangement of the circuit breakers, and connecting bus bars interconnecting the circuit breakers in series and the outside led-out devices are disposed on one side of the circuit breakers and the at least one main bus bar is disposed on the other side of the circuit breakers. Therefore, the fixing area can be reduced and the connection between the at least one main bus bar and the circuit breakers and between the circuit breakers and the outside led-out devices can be easily established.

5 Claims, 4 Drawing Sheets

GAS-INSULATED SWITCHGEAR EQUIPMENT

BACKGROUND OF THE INVENTION

1. Field of the Invention

This invention relates generally to gas-insulated switchgear equipment and, more particularly, to gas-insulated switchgear equipment constituted by connecting a plurality of vertical-type circuit breakers.

2. Description of the Prior Art

An example of conventional gas-insulated switchgear equipment of this type, such as the one shown in FIG. 10 on page 147 of BROWN BOVERI REV. vol. 4, No. 73 is known.

The gas-insulated switchgear equipment is called a one-and-a-half circuit breaker system and in the system, a pair of gas-insulated bus bars are disposed in parallel and three horizontal-type circuit breakers are horizontally disposed on a straight line bridging the pair of bus bars. The circuit breakers are connected in series by connecting bus bars disposed between the circuit breakers.

Since this type of gas-insulated switchgear equipment uses connecting bus bars which are disposed between the circuit breakers, a large fixing space for the equipment is needed in a straight line direction of the disposition of the circuit breakers.

Although the described example of a gas-insulated switchgear equipment is constructed by using horizontal-type circuit breakers, it is also possible to constitute the same gas-insulated switchgear equipment by using vertical-type circuit breakers. However, this method not only has the above-described problem but also needs to devise a disposition of the bus bars as well as connections between the circuit breakers and between the circuit breakers and the bus bars.

In view of these problems, gas-insulated switchgear equipment such as one-and-a-half circuit breaker systems and ring bus system using a plurality of vertical-type circuit breakers have been proposed in Japanese Patent Unexamined Publication Nos. 57-193911, 57-211915 (U.S. counterpart: U.S. Pat. No. 4,503,481), and 59-6706. In this equipment, a pair of main bus bars are disposed parallel to a fixing base and a plurality of vertical-type breakers are disposed at one side of the bus bars generally in parallel to the bus bars. Cable heads provided as outside led-out means are disposed at the other side of the main bus bar which is the most remote from the breakers. Gas-insulated connecting bus bars electrically connected between the juxtaposed circuit breakers, between the circuit breakers and the main bus bars and between the circuit breakers and the cable heads.

In the gas-insulated switchgear equipment, each of the vertical-type circuit breakers has led-out portions extending from its breaking section on the one side facing the main bus bars. Therefore, there is no element on the other side of each of the circuit breakers. This is advantageous in terms of inspection and maintenance of the circuit breakers. However, the equipment has disadvantages whereby the connecting structure using the connecting bus bars becomes complex and the fixing area to fix the equipment becomes when taking connecting operations into consideration.

SUMMARY OF THE INVENTION

It is therefore an object of the present invention to provide gas-insulated switchgear equipment capable of disposing the circuit breakers closer to each other and reducing the fixing area thereof.

It is another object of the present invention to provide gas-insulated switchgear equipment in which electrical connections between the circuit breakers and between the breakers and the main bus bars are easily established.

Gas-insulated switchgear equipment according to the invention comprises a plurality of circuit breakers electrically connected in series, outside led-out means connected to each of connecting portions of the circuit breakers, and at least one main bus bar connected to two of the plurality of circuit breakers disposed at ends of the electrical connection, in which the plurality of circuit breakers are of a vertical type and arranged on a straight line and have led-out portions of terminals thereof in directions perpendicular to the direction of the arrangement of the breakers and connecting bus bars for connecting the circuit breakers in series and the outside led-out device are disposed on one side of the circuit breakers while the main bus bar is disposed on the other side of the circuit breakers.

With the arrangement, the equipment of the invention can dispose the circuit breakers closer to each other in comparison with the prior art equipment in which the connecting bus bars are disposed between the circuit breakers, thereby reducing the fixing area. Further, since the connecting bus bar and the outside led-out device are arranged at one side of the arrangement of the circuit breakes and the main bus bars are disposed at the other side, it is possible to simplify the electrical connections among the elements.

DESCRIPTION OF THE PREFERRED EMBODIMENTS

Figure 4:
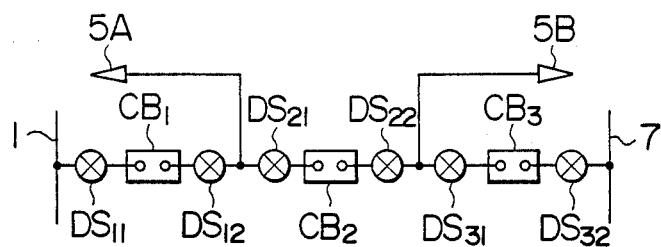
FIG. 4 is a connection diagram of the gas-insulated switchgear equipment shown in FIG. 1.

Embodiments of the present invention will be described hereinafter with reference to the accompanying drawings. A circuit shown in FIG. 4 is called a one-and-a-half circuit breaker system to which gas-insulated switchgear equipment according to the present invention is applied. Three circuit breakers $CB_1$, $CB_2$ and $CB_3$, having at their opposite sides disconnecting switches $DS_{11}$ and $DS_{12}$, $DS_{21}$ and $DS_{22}$, $DS_{31}$ and $DS_{32}$, are placed on a fixing base and electrically connected in series. Outside led-out means 5A and 5B such as cable heads are led out from points between the disconnecting switches. The three circuit breakers $CB_1$, $CB_2$, and $CB_3$ connected in series are connected between main bus bars 1 and 7.

Figure 1:
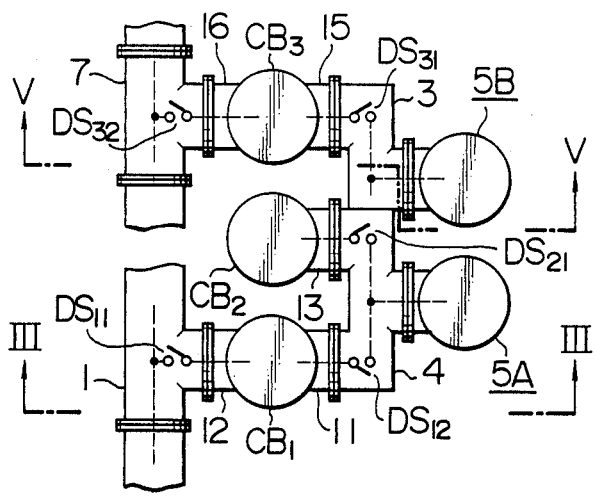
FIG. 1 is a schematic plan view of a gas-insulated switchgear equipment of an embodiment of the present invention.
Figure 2:
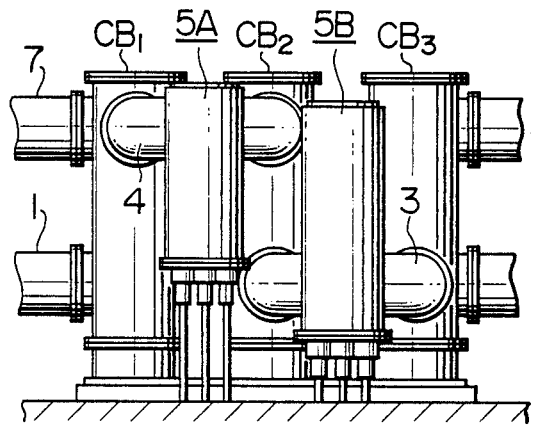
FIG. 2 is a right side view of the gas-insulated switchgear equipment shown in FIG. 1.
Figure 3:
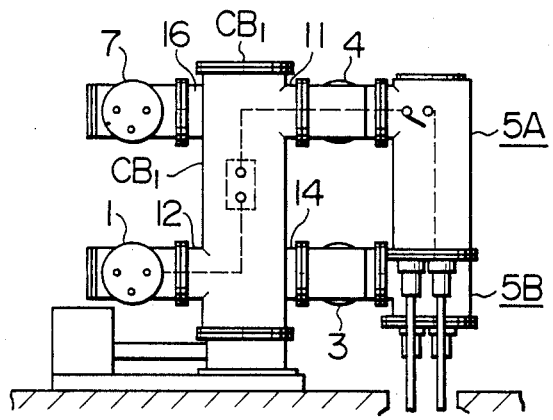
FIG. 3 is a sectional side view taken along the line III—III of FIG. 1.

Gas-insulated switchgear equipment based on the circuit arrangement is shown in FIG. 1. The circuit breakers $CB_1$, $CB_2$, and $CB_3$ are of a vertical type and include a breaking unit adapted for three or one phase disposed in a grounding tank which is filled with insulating gas. The circuit breakers $CB_1$, $CB_2$, and $CB_3$ are disposed on a straight line. Led-out portions 11, 13, 14, and 15 of terminals and connecting bus bars 3, 4, which are used to electrically interconnect the circuit breakers as indicated by broken lines in FIG. 1, are provided at one side of the circuit breakers $CB_1$, $CB_2$, and $CB_3$. In more detail, as shown in FIGS. 1 to 3, the circuit breaker $CB_1$ has a led-out portion 11 provided at an upper portion thereof that leads out an upper terminal of the breaking unit to the one side, and the adjacent circuit breaker $CB_2$ has a led-out portion 13 provided at an upper portion thereof and another led-out portion 14 provided at a lower portion thereof which lead upper and lower terminals of the breaking unit to the one side, respectively. A connecting bus bar 4 to interconnect the led-out portions 11, 13 is also disposed at the one side. The circuit breaker $CB_3$ has, as shown in FIGS. 1 to 3, a led-out portion 15 at a lower portion thereof which leads a lower terminal of the breaking unit to the one side. A connecting bus bar 3 to interconnect the led-out portions 14, 15 is also disposed at the one side. A lower terminal of the breaking unit of the circuit breaker $CB_1$ is led by a led-out portion 12 provided at a lower portion of the circuit breaker to the other side of the circuit breaker and is connected to a main bus bar 1 extending in a direction of the arrangement of the circuit breakers. Similarly, as can be understood from FIGS. 1 to 3, an upper terminal of the breaking unit of the circuit breaker $CB_3$ is led by a led-out portion 16 extending from the other side of the circuit breaker and is connected to a main bus bar 7 which extends above and generally in parallel with the main bus bar 1. In the embodiment, as shown in FIG. 1, a disconnecting switch $DS_{11}$ for the circuit breaker $CB_1$ is provided within the main bus bar 1 and a disconnecting switch $DS_{12}$ is provided within the connecting bus bar 4. A disconnecting switch $DS_{21}$ for the circuit breaker $CB_2$ is provided within the connecting bus bar 4, and a disconnecting switch $DS_{22}$ is provided within the connecting bus bar 3. A disconnecting switch $DS_{31}$ for the circuit breaker $CB_3$ is provided within the connecting bus bar 3 and the disconnecting switch $DS_{32}$ is provided within the main bus bar 7 extending at a higher level.

As shown in FIGS. 1 and 2, outside led-out devices 5A and 5B are connected to side portions of the connecting bus bars 3 and 4. Each of the outside led-out devices 5A and 5B that extends downward comprises a casing, a connecting conductor disposed in the casing, and an insulated terminal while establishing gas-insulation. That is, the outside led-out device 5A is connected to a side portion of the connecting bus bar 4 interconnecting the circuit breakers $CB_1$ and $CB_2$ and the outside led-out device 5B is connected to a side portion of the connecting bus bar 3 interconnecting the circuit breakers $CB_2$ and $CB_3$, and these devices are disposed such that they extend downward from their connecting portions.

Accordingly, the outside led-out device 5A is connected between the disconnecting switches $DS_{12}$ and $DS_{21}$ in the connecting bus bar 4. Similarly, the outside led-out device 5B is connected between the disconnecting switches $DS_{22}$ and $DS_{31}$ in the connecting bus bar 3.

The circuit arrangement shown in FIG. 4 will now be described. It should be noted here that the led-out portions 11, 13, 14, 15 and the connecting bus bars 3, 4 used to establish electrical connection between the circuit breakers $CB_1$, $CB_2$, $CB_3$ are not placed on portions of the circuit breakers facing each other. With the construction, it is possible to reduce a distance between, for example, the circuit breakes $CB_1$, $CB_2$ to an extent of an axial length of the connecting bus bar 4 inclusive the disconnecting switches $DS_{12}$, $DS_{21}$.

Figure 5:
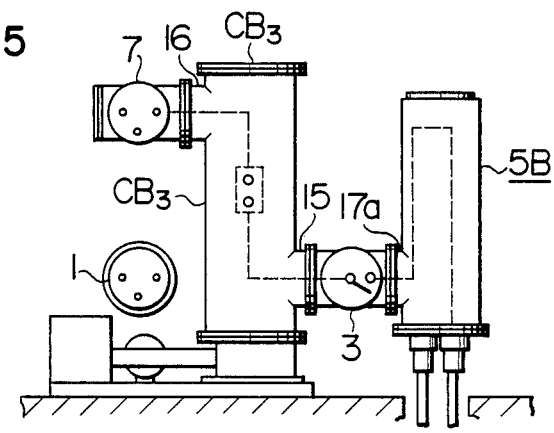
FIG. 5 is a sectional side view taken along the line V—V of FIG. 1.
Figure 6:
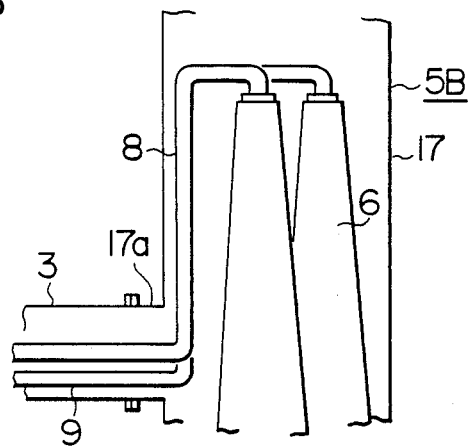
FIG. 6 is an enlarged schematic cross-sectional view of an essential portion shown in FIG. 5.

In this embodiment, as three circuit breakers $CB_1$, $CB_2$, $CB_3$ are arranged on the straight line and are electrically connected in series, two connecting bus bars 3, 4 are required. However, as the led-out portions 11, 13 respectively provided at the upper portion of the circuit breakers $CB_1$, $CB_2$ are interconnected by the connecting bus bar 3 and the led-out portions 14, 15 respectively provided at the lower portion of the circuit breakers $CB_2$, $CB_3$ are interconnected by the connecting bus bar 4, it is possible to vertically dispose the both connecting bus bars 3, 4 substantially parallel with each other with a linear structure, so that the structure thereof can be made simple. In this construction, the positions of connections between the circuit breakers and the outside led-out devices 5A and 5B and the heights of the devices are different from each other, and the connecting position of the outside led-out device 5B connected to the connecting bus bar 3 coincides with a level of the led-out portion 15 leading out the lower terminal of the circuit breaker $CB_3$, as shown in FIGS. 2, 3, 5. In a case where the outside led-out device 5B is a cable head, the height does not become a disadvantage by structuring the cable head as illustrated in FIG. 6. That is, internal conductors 9, which are provided within the connecting bus bar 3 are led through a connecting portion 17a formed in a portion of cable head casing 17 and are turned upward along a side of cable heads 6 and are connected to upper terminals of the cable heads 6. Since conductors 8 turned upward face insulators of the cable heads 6, they can be disposed within the cable head casing 17 without increasing the diameter of the casing 17 while a suitable degree of insulation from the, cable head casing 17 is maintained. Therefore, when cable heads are used, it is possible for the outside led-out devices 5A, 5B to have identical appearances except for the positions of the portions connected to the connecting bus bars 3, 4.

Figure 7:
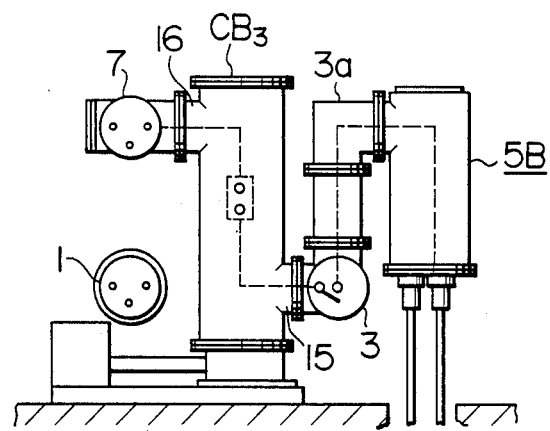
FIG. 7 is a sectional side view of another embodiment of the structure shown in FIG. 5.

In order to make the outside led-out device 5A connected to the connecting bus bar 4 and the outside led-out device 5B connected to the connecting bus bar 3 have the same height, an arrangement, for example as shown in FIG. 7, may be adapted in which an upwardly extending intermediate connecting bus bar 3a is connected at its lower end of the lower led-out portion 15 of the circuit breaker $CB_3$ and is connected at its upper end to the outside led-out device 5B at the same level as the led-out portions of the circuit breakers $CB_1$, $CB_2$. With this construction, the outside led-out devices 5A, 5B have the same height, so that parts for the devices can be commonly used and a side profile of the gas-insulated switchgear equipment can be a suitable profile.

The connecting bus bars 3, 4 and the intermediate connecting bus bar 3a, which are used to connect the circuit breakers CB$_1$, CB$_2$, CB$_3$ in series so as to construct a plurality of gas-insulated switchgear devices of the one-and-a-half circuit breaker type, may be of a type having a cylindrical casing in which a connection conductor in a gas-insulation manner is disposed similarly with the well known main bus bars 1, 7, or of other specifically designed types.

Figure 8:
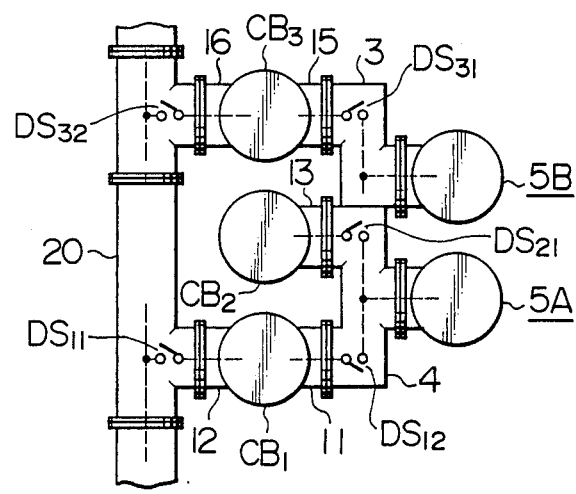
FIG. 8 is a schematic plan view of a gas-insulated switchgear equipment of another embodiment of the present invention.
Figure 9:
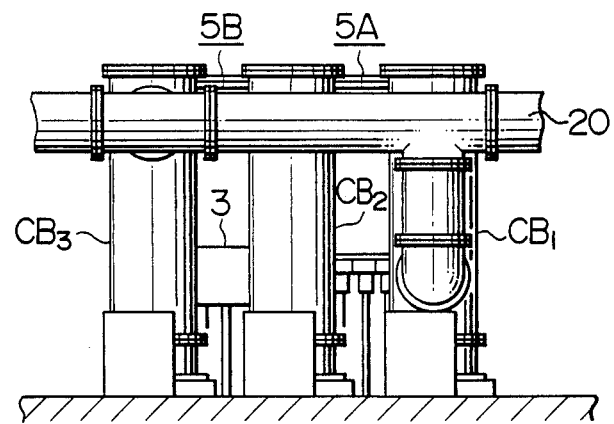
FIG. 9 is a left side view of the gas-insulated switchgear equipment shown in FIG. 8.
Figure 10:
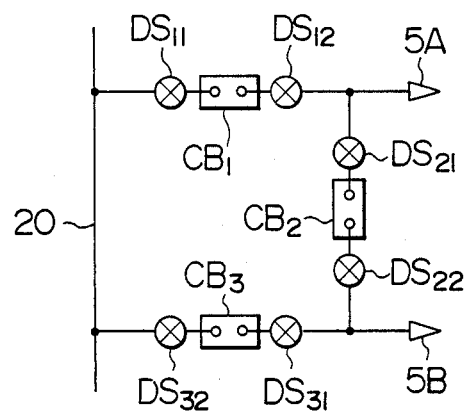
FIG. 10 is a connection diagram of the gas-insulated switchgear shown in FIG. 8.

FIGS. 8 to 10 show gas-insulated switchgear equipment of another embodiment according to the present invention. This embodiment is based on a ring bus bar type of circuit arrangement shown in FIG. 10, in which the circuit breakers CB$_1$, CB$_3$ located at both ends of a series connection of three circuit breakers are connected to a main bus bar 20.

This embodiment will be described with reference to FIG. 8 and FIG. 9. In this embodiment, components identical to those of the first embodiment are indicated by the same reference characters and descriptions for the same constructions are omitted. This embodiment will be described with respect to points of difference from the first embodiment.

As can be understood from comparison between the circuit shown in FIG. 4 and the circuit shown in FIG. 10, the connection between the circuit breakers CB$_1$ and CB$_2$ and the connection between the circuit breakers CB$_2$ and CB$_3$ are the same as the circuit shown in FIG. 4 and only the connection between the circuit breakers CB$_1$ and CB$_3$ is different. That is, as shown in FIGS. 8 and 9, a led-out portion 12 which leads out a lower terminal of the circuit breaker CB$_1$ in an opposite side to the connecting bus bar 4 side is connected to a portion of a main bus bar 20 which extends downward from the main bus bar 20 so that it is generally L-shaped, while a led-out portion 16 which leads out an upper terminal of the circuit breaker CB$_3$ in an opposite side to the connecting bus bar 3 side is connected to the main bus bar 20 which extends at a higher level in a direction of an arrangement of the circuit breakers, thus constituting gas-insulated switchgear equipment corresponding to the ring bus bar system shown in FIG. 10. The main bus bar 20 may be disposed so as to extend at a lower level. In this construction also, the circuit breakers CB$_1$, CB$_2$ and CB$_3$ are arranged on a straight line and the main bus bar 20 is disposed at one side of the arrangement of the circuit breakers and is extended in the direction of the arrangement, and the connecting bus bars 3, 4 and the outside led-out devices 5A, 5B are disposed on the other side as with the first embodiment. Therefore, the circuit breakers can be disposed closer to each other in the direction of the arrangement, so that total fixing space can be reduced.

As can be understood from the above-described embodiments, the present invention can be applied to a gas-insulated switchgear system, in which a plurality of gas-insulated switchgear devices are provided, in each of which a plurality of circuit breakers are arranged on a straight line. One or two main bus bars are provided, extending in the direction of the arrangement, and the circuit breakers and the main bus bar or bars are interconnected.

As described above, a plurality of vertical-type circuit breakers are closely arranged on a substantially straight line and connecting bus bars interconnecting the circuit breakers and outside led-out devices are provided on one side of the arrangement of the circuit breakers and one or more main bus bars are extended on the other side of the arrangement. Therefore, no connecting bus bars exist between opposite portions of the circuit breakers as in the case of the conventional system, so that a plurality of gas-insulated switchgear equipments can be closely disposed, thereby reducing the installation space. Also, electrical connection among the elements can be easily established.

What is claimed is:

1. A gas insulated switchgear apparatus in which at least three vertical type gas insulated circuit breakers are arranged in a substantially straight line so as to make one set, said three circuit breakers being electrically connected in series connection by two connecting bus bars so that respective ones of said circuit breakers electrically located at both ends of said series connection are connected to at least one main bus bar and a plurality of outside led-out devices are respectively connected to said two connecting bus bars, each of said circuit breakers having an upper portion and a lower portion with a first led-out portion extending from a terminal of the upper portion and a second led-out portion extending from a terminal of the lower portion, each of said first and second led-out portions extending in a direction perpendicular to a direction of said straight line, said two connecting bus bars and said plurality of outside led-out devices connected to said two connecting bus bars being disposed on one side of said set of circuit breakers and said at least one main bus bar extending in the same direction as said straight line and being disposed on the other side of said set of circuit breakers, said plurality of outside led-out devices being respectively disposed between adjacent ones of said circuit breakers connected by said connecting bus bars.

2. A gas insulated switchgear apparatus according to claim 1, wherein at least one of said plurality of outside led-out devices is connected to one of said two connecting bus bars interconnecting two of said second led-out portions, said at least one outside led-out device having a cable head disposed in a vertical type of cable head casing with a vertical conductor being disposed in said cable head casing so as to establish an electrical connection between said one connecting bus bar and said cable head.

3. A gas insulated switchgear apparatus in which at least three vertical type gas insulated circuit breakers are arranged in a substantially straight line so as to make one set, said three circuit breakers being electrically connected in series connection by two connecting bus bars so that respective ones of said circuit breakers electrically located at both ends of said series connection are connected to at least one main bus bar and a plurality of outside led-out devices are respectively connected to said two connecting bus bars, each of said circuit breakers having an upper portion and a lower portion with a first led-out portion extending from a terminal of the upper portion and a second led-out portion extending from a terminal of the lower portion, each of said first and second led-out portions extending in a direction perpendicular to a direction of said straight line, said two connecting bus bars and said plurality of outside led-out devices connected to said two connecting bus bars being disposed on one side of said set of circuit breakers and said at least one main bus bar extending in the same direction as said straight line and being disposed on the other side of said set of circuit breakers, said plurality of outside led-out devices being at different heights in accordance with said terminals of said upper and lower portions.

4. A gas insulated switchgear apparatus in which at least three vertical type gas insulated circuit breakers are arranged in a substantially straight line so as to make one set, said three circuit breakers being electrically connected in series connection by two connecting bus bars so that respective ones of said circuit breakers electrically located at both ends of said series connection are respectively connected to two main bus bars extending in the same direction as said straight line and a plurality of outside led-out devices are respectively connected to side portions of said two connecting bus bars, each of said circuit breakers having an upper portion and a lower portion with a first led-out portion extending from a terminal of the upper portion and a second led-out portion extending from a terminal of the lower portion, each of said first and second led-out portions extending in a direction perpendicular to a direction of said straight line, said tow connecting bus bars and said plurality of outside led-out devices connected to said two connecting bus bars being disposed on one side of said set of circuit breakers and said two main bus bars being substantially parallel in the vertical direction and disposed on the other side of said set of circuit breakers, said plurality of outside led-out devices being disposed between adjacent ones of said circuit breakers and extending downward from said side portions of said two connecting bus bars.

5. A gas insulated switchgear apparatus according to claim 4, wherein the lower one of said two main bus bars is connected to said second led-out portion of a respective one of said three circuit breakers electrically located at one end of said series connection and the upper one of said two main bus bars is connected to said first led-out portion of a respective one of said three circuit breakers located at the other end of said series connection.

* * * * *